US012762403B2

(12) United States Patent
Hsu et al.

(10) Patent No.: US 12,762,403 B2
(45) Date of Patent: Oct. 13, 2026

(54) METHOD OF TRAINING A MODEL USING DATA ESSENCE

(71) Applicants: INVENTEC (PUDONG) TECHNOLOGY CORPORATION, Shanghai (CN); INVENTEC CORPORATION, Taipei City (TW)

(72) Inventors: Chih-Fan Hsu, Taipei City (TW); Wei-Chao Chen, Taipei City (TW); Ming-Ching Chang, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 371 days.

(21) Appl. No.: 18/665,405

(22) Filed: May 15, 2024

(65) Prior Publication Data

US 2025/0292077 A1 Sep. 18, 2025

(30) Foreign Application Priority Data

Mar. 18, 2024 (CN) ......................... 202410310237.3

(51) Int. Cl.
*G06N 3/08* (2023.01)
*G06N 3/0455* (2023.01)

(52) U.S. Cl.
CPC ............. *G06N 3/08* (2013.01); *G06N 3/0455* (2023.01)

(58) Field of Classification Search
CPC ...... G06N 3/08; G06N 3/0455; G06N 3/0464; G06V 10/774; G06V 10/454; G06V 10/82
USPC ............................................................ 706/25
See application file for complete search history.

(56) References Cited

U.S. PATENT DOCUMENTS

| | | | | |
|---|---|---|---|---|
| 12,217,137 | B1 * | 2/2025 | Fakoor | G06N 20/00 |
| 2022/0261633 | A1 * | 8/2022 | Butvinik | G06N 3/09 |
| 2024/0103754 | A1 * | 3/2024 | Phan | G06F 3/0653 |
| 2026/0080310 | A1 * | 3/2026 | Hsu | G06N 3/0455 |

* cited by examiner

*Primary Examiner* — Tung T Vo
(74) *Attorney, Agent, or Firm* — Maschoff Brennan

(57) ABSTRACT

A method of training a model using data essence is performed by a computing device and includes: performing an essence generating procedure according to raw datum to generate a data essence, adding the data essence to an essence memory, and repeatedly performing a training procedure before the model converges. The training procedure includes: obtaining a training batch, updating a replay memory according to the training batch, wherein the replay memory before updating includes a plurality of data from an old training batch, and training the model according to the replay memory and the essence memory.

6 Claims, 11 Drawing Sheets

METHOD OF TRAINING A MODEL USING DATA ESSENCE

CROSS-REFERENCE TO RELATED APPLICATIONS

This non-provisional application claims priority under 35 U.S.C. § 119(a) on Patent Application No(s). 202410310237.3 filed in China on Mar. 18, 2024, the entire contents of which are hereby incorporated by reference.

BACKGROUND

1. Technical Field

The present disclosure relates to Artificial Intelligence (AI) and Machine Learning ML), and more particular to a method of training a model using data essence.

2. Related Art

Catastrophic forgetting is a major concern in the practical application of AI/ML models. Catastrophic forgetting refers to the phenomenon where a model gradually forgets previously learned data while continually training on new data, leading to the model's inability to perform well on both new and old data, such as a decrease in classification accuracy.

Traditional approaches to mitigate performance degradation typically involve retaining a small amount of important data and incorporating this retained data into the new training task. Although this approach helps reduce the degradation in performance, its effectiveness is limited.

SUMMARY

In light of the above descriptions, the purpose of the present disclosure is to further reduce the performance degradation of the model caused by the transformation of new and old data during training.

According to one or more embodiment of the present disclosure, a method of training a model using data essence is performed by a computing device. The method includes: performing an essence generating procedure according to raw datum to generate a data essence; adding the data essence to an essence memory; and repeatedly performing a training procedure before the model converges. The training procedure includes: obtaining a training batch; updating a replay memory according to the training batch, wherein the replay memory before updating comprises a plurality of data from an old training batch; and training the model according to the replay memory and the essence memory.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

The method of training a model using data essence proposed in the present disclosure is performed by a computing device. In an embodiment, the computing device may be implemented by at least one of the following examples: personal computer, network server, central processing unit (CPU), graphic processing unit (GPU), microcontroller (MCU), application processor (AP), field programmable gate array (FPGA), application-specific integrated circuit (ASIC), system-on-a-chip (SoC), deep learning accelerator, or any electronic device with similar functionalities. The present disclosure does not limit the hardware type of the computing device.

Figure 1:
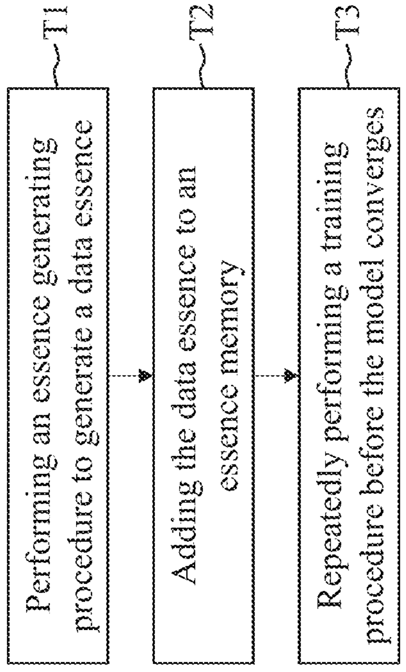
FIG. 1 is a flowchart of a method of training a model using data essence according to an embodiment of the present disclosure.

FIG. 1 is a flowchart of a method of training a model using data essence according to an embodiment of the present disclosure and includes steps T1-T3. This method is applicable for Continual Learning (CL), where CL refers to continuously updating the model by performing a plurality of training tasks in chronological order over time. Each training task can perform the method shown in FIG. 1. When the method proposed in the present disclosure is applied to CL, the corresponding pseudocode is provided in Table 1. Please refer to both FIG. 1 and Table 1.

TABLE 1 pseudocode for the method of training the model using date essence applied in a CL scenario.

| | |
|---|---|
| 01 | Initialize a replay memory $\mathcal{R}$, a essence memory $\mathcal{E}$, a model $\mathcal{M}$ |
| 02 | for each training task i do |
| 03 |   $E^i \leftarrow$ EssenceGeneration($\mathcal{R}^i$) |
| 04 |   $\mathcal{E} \leftarrow \mathcal{E} \cup E^i$ |
| 05 |   repeat |
| 06 |     Get a training batch $\mathcal{B}$ |
| 07 |     $\mathcal{R} \leftarrow$ ImportanceSampling($\mathcal{B}$, $\mathcal{R}$, $\mathcal{M}$) |
| 08 |     $\mathcal{M} \leftarrow$ ExperienceBlending($\mathcal{E}$, $\mathcal{R}$, $\mathcal{M}$) |
| 09 |   until model $\mathcal{M}$ converges |
| 10 | end for |

Please refer to the row 01 of Table 1. Before performing the method shown in FIG. 1, the computing device initializes a replay memory, an essence memory, and the model. The memory may be physical or virtual storage spaces used to store the training data and data essence extracted from the training data. The present disclosure does not limit the use of hardware or software to implement the memory. In an embodiment, the replay memory and the essence memory may be implemented using Network Attached Storage (NAS).

The following explains steps T1 to T3, assuming that the method shown in FIG. 1 corresponds to the $i^{th}$ (corresponding to the row 02 of Table 1) training task in CL.

In steps T1 and T2 (corresponding to row 03 and row 04 of Table 1), the computing device performs an essence generating procedure to generate a data essence, and then adds the data essence to the essence memory. Since the training data used in the $(i-1)^{th}$ training task may not be available when performing the $i^{th}$ training task, in order to avoid performance degradation of the model due to catastrophic forgetting in subsequent training tasks, the data of the current training task is distilled as the data essence and stored.

In step T3, the computing device repeatedly performs a training procedure (corresponding to rows 05-08 of Table 1) before the model converges (corresponding to row 09 of Table 1).

Figure 5:
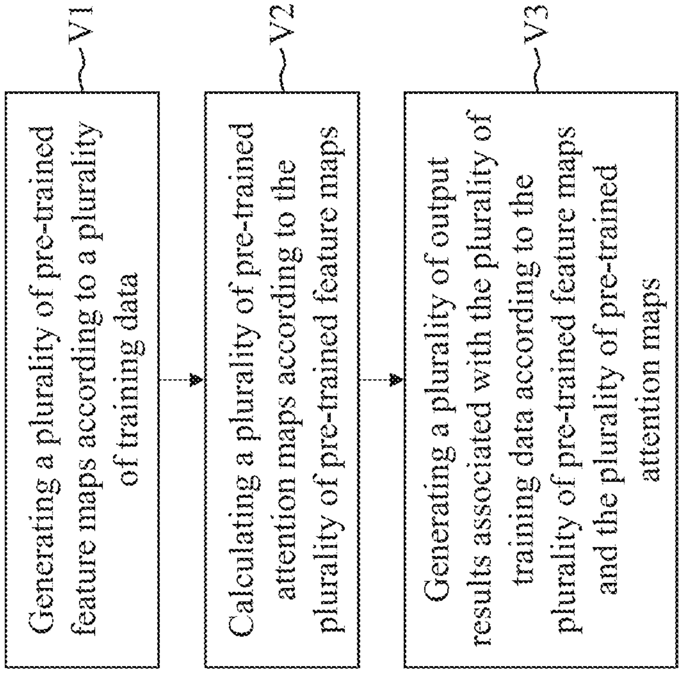
Figure 6:
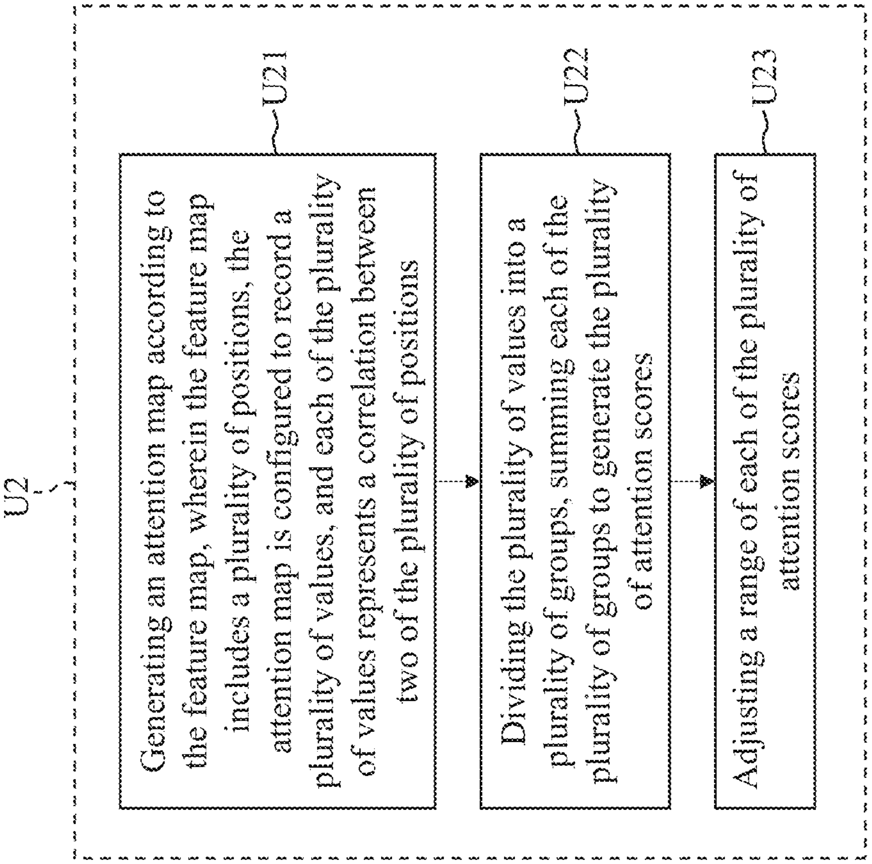
FIG. 6 is a flowchart of calculating attention scores according to an embodiment of the present disclosure.
Figure 7:
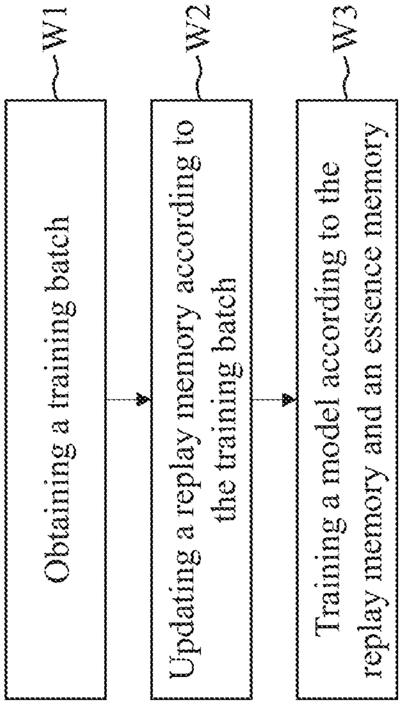
FIG. 7 is a flowchart of a training procedure according to an embodiment of the present disclosure.
Figure 8:
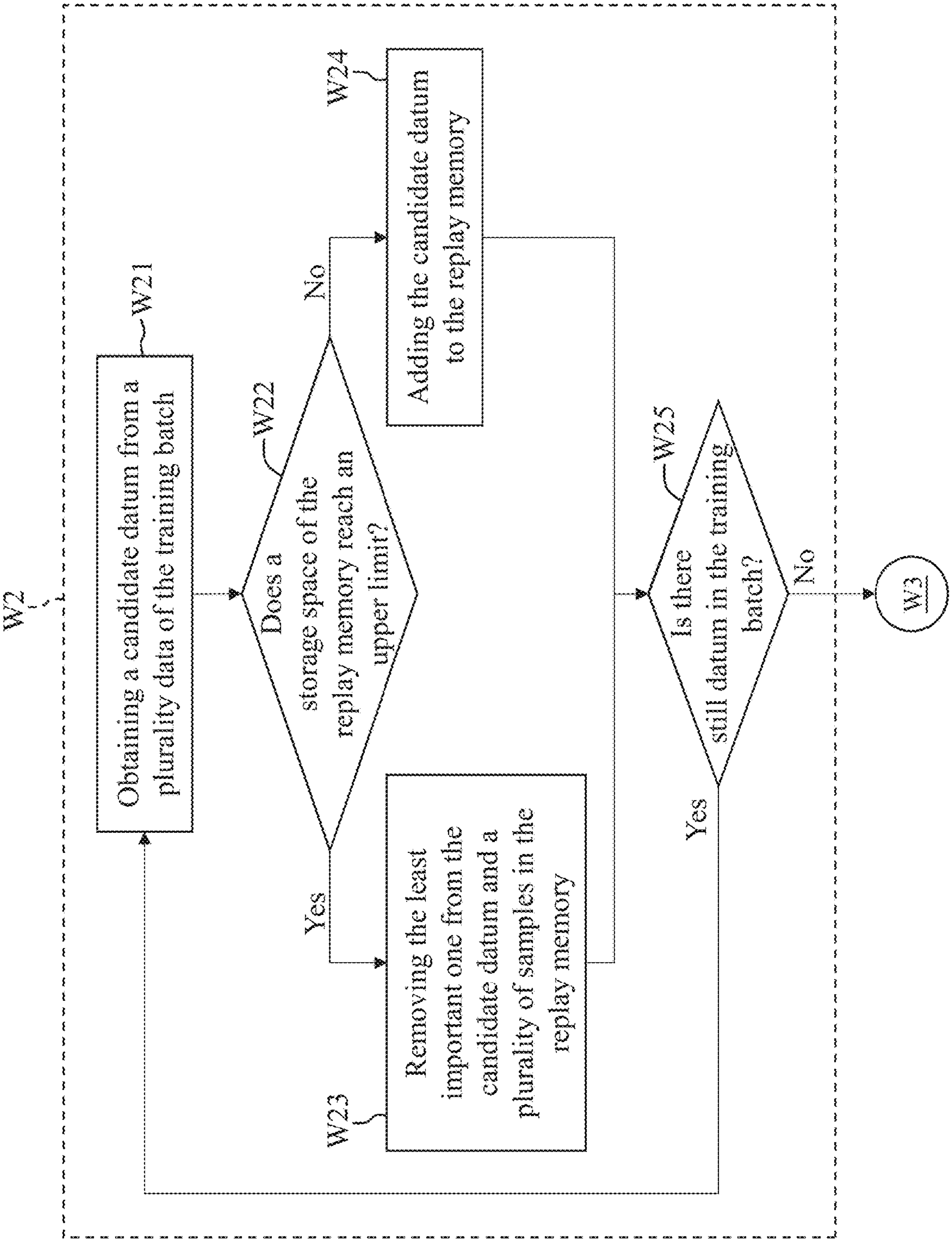
FIG. 8 is a flowchart of a method for updating the replay memory according to an embodiment of the present disclosure.
Figure 9:
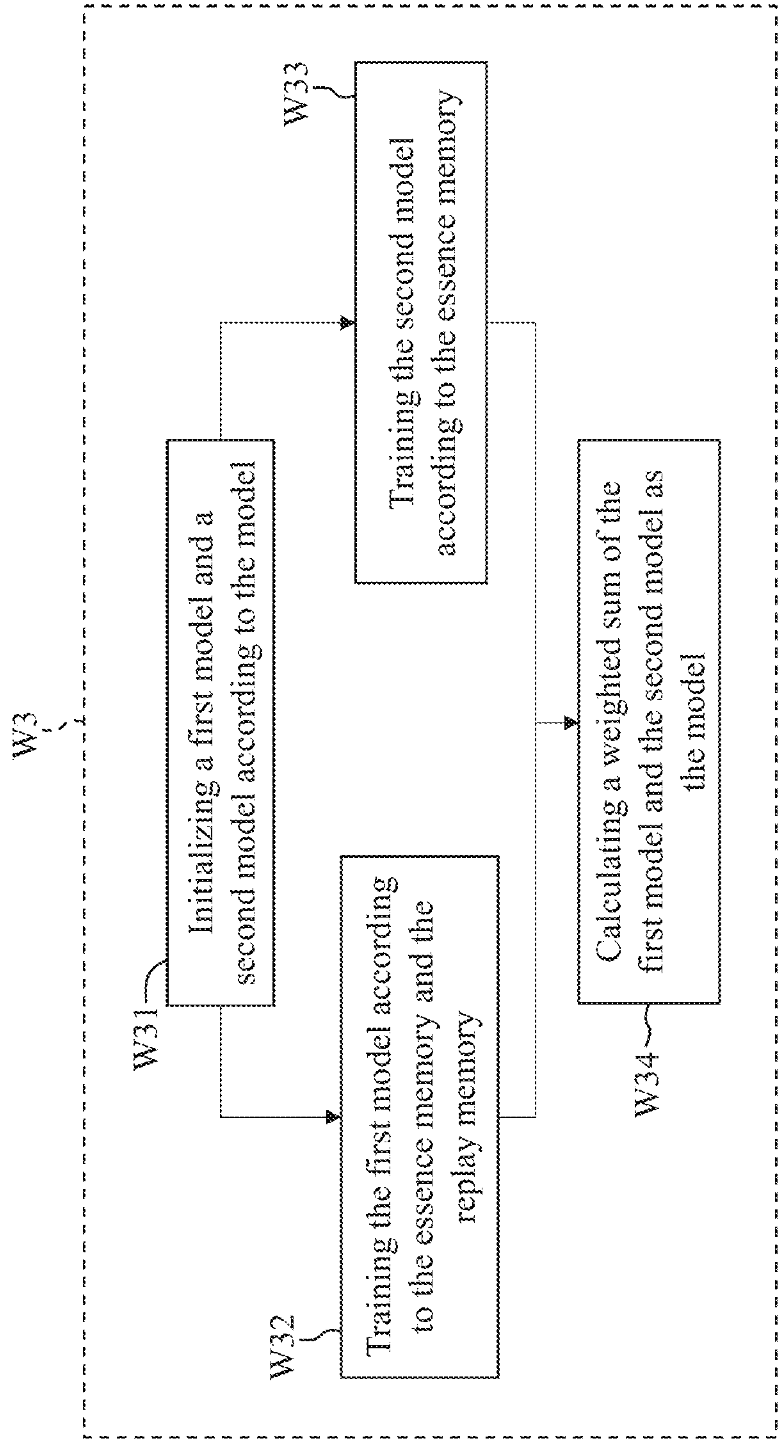
FIG. 9 is a flowchart of an experience blending algorithm according to an embodiment of the present disclosure.

The following will first explain the generating procedure of data essence through FIG. 2 to FIG. 6, and then explain the execution details of the training procedure through FIG. 7 to FIG. 9.

Figure 2:
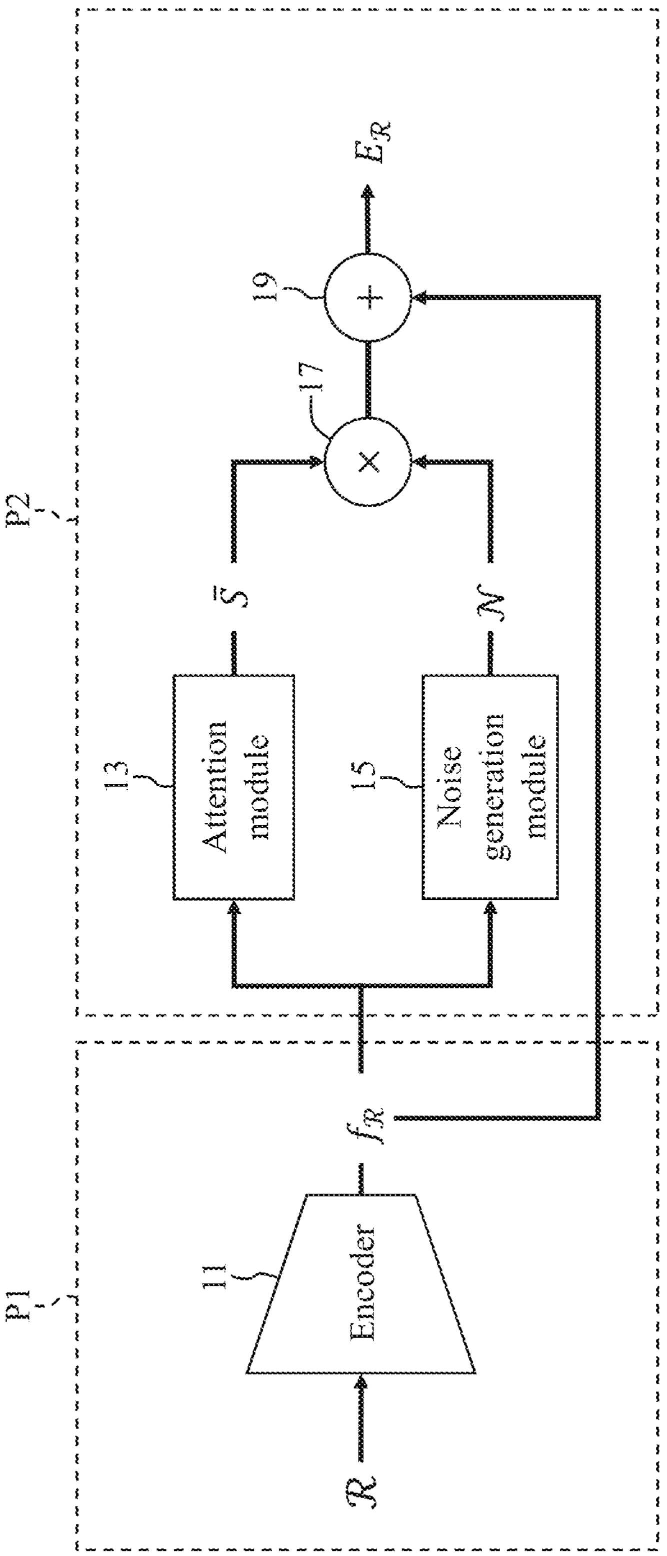
FIG. 2 and FIG. 3 respectively illustrate a schematic diagram and a flowchart of an essence generating procedure according to an embodiment of the present disclosure.
Figure 3:
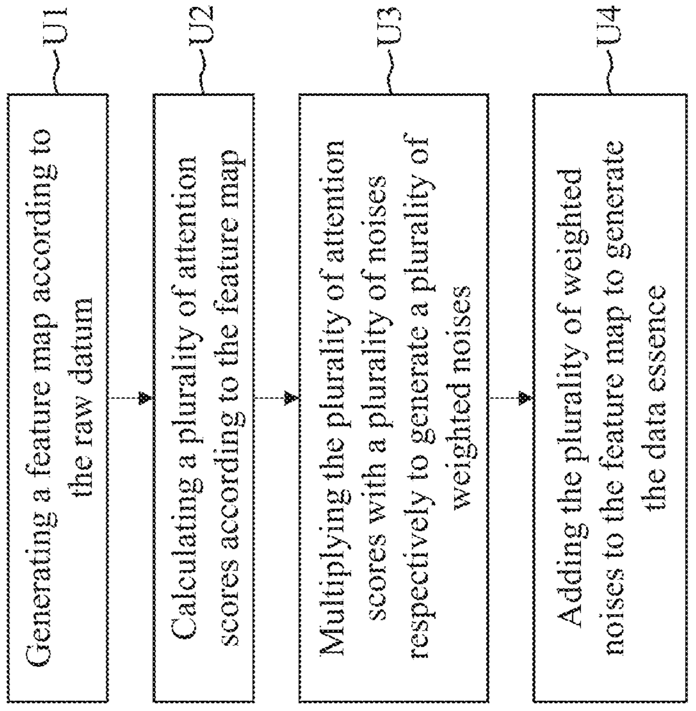

FIG. 2 and FIG. 3 respectively illustrate a schematic diagram and a flowchart of an essence generating procedure according to an embodiment of the present disclosure. As shown in FIG. 2, this procedure includes a feature generating phase P1 and an essence generating phase P2, where the feature generating phase P1 corresponds to step U1, and the essence generating phase corresponds to steps U2 to U4.

In step U1, the computing device inputs a raw datum $\mathcal{R}$ into an encoder 11. The encoder 11 mimics the way human stores memory (data), and converts the data into a feature map $f_{\mathcal{R}}$ that can only be read by machines.

Figure 4:
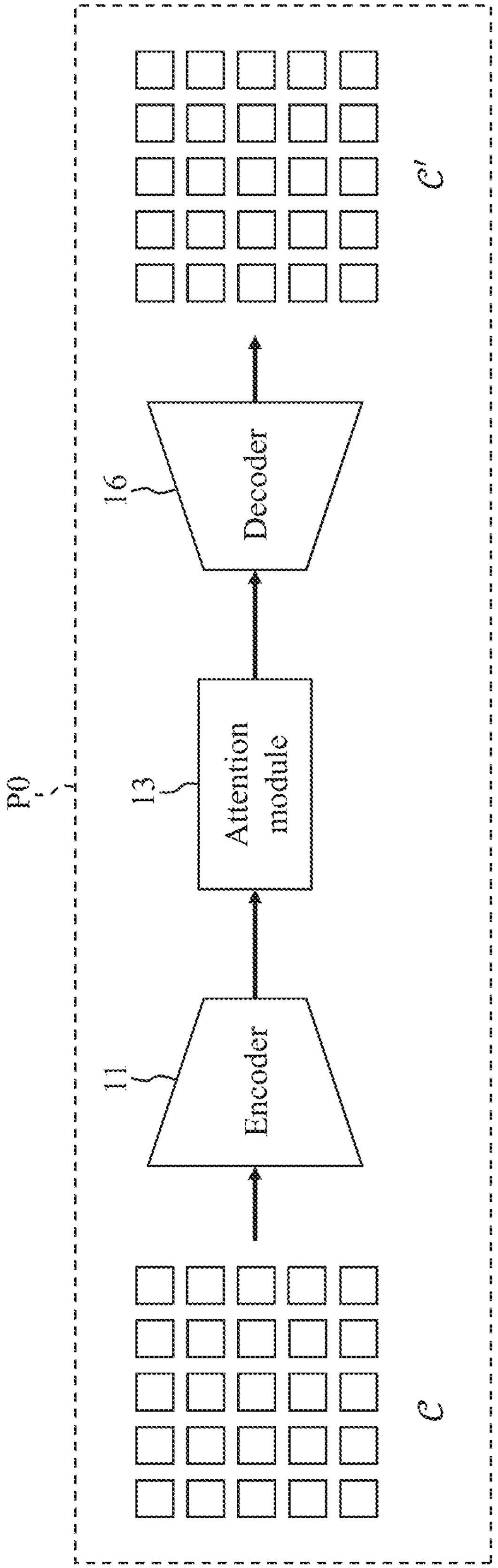
FIG. 4 and FIG. 5 respectively illustrate a schematic diagram and a flowchart of a pre-training phase according to an embodiment of the present disclosure.

In an embodiment, before step U1, the essence generating procedure further includes a pre-training phase. FIG. 4 and FIG. 5 respectively illustrate a schematic diagram and a flowchart of a pre-training phase according to an embodiment of the present disclosure.

Please refer to both FIG. 4 and FIG. 2. The pre-training phase P0 is configured to train the encoder 11 required for the feature generating phase P1 and an attention module 13 required for the essence generating phase P2.

In step V1, the computing device inputs a plurality of training data $\mathcal{C}$ into the encoder 11 to generate a plurality of pre-trained feature maps. In an embodiment, the training data $\mathcal{C}$ may include at least one of CIFAR-10, CIFAR-100, TinyImageNet, and ImageNet datasets, and the present disclosure does not limit the quantity or type of training data $\mathcal{C}$.

In step V2, the computing device inputs the plurality of pre-trained feature maps into the attention module 13 to calculate a plurality of pre-trained attention maps. In an embodiment, the attention module 13 may be integrated into the last layer of the encoder 11.

In step V3, the computing device inputs the integrated result of the plurality of pre-trained feature maps and the plurality of pre-trained attention maps into the decoder 16 to generate a plurality of output results $\mathcal{C}'$ associated with the plurality of training data. In an embodiment, the encoder 11 and the decoder 16 are implemented by an autoencoder. When training the autoencoder, the attention module 13 may be added and trained together. In other embodiments, examples such as Multi-Layer Perception (MLP), Convolutional Neural Network (CNN), or Vision Transformer may be used to implement the encoder 11 and the decoder 16.

Please refer to FIG. 2 and FIG. 3. In step U2, the computing device inputs the feature map $f_{\mathcal{R}}$ into the attention module 13 to calculate a plurality of attention scores $\overline{S}$. Regarding the calculation of attention scores (or pre-trained attention scores), please refer to FIG. 6.

FIG. 6 is a flowchart of calculating attention scores according to an embodiment of the present disclosure, including steps U21 to U23.

In step U21, the attention module 13 generates an attention map according to the feature map $f_{\mathcal{R}}$, where the feature map $f_{\mathcal{R}}$ includes a plurality of positions, the attention map is configured to record a plurality of values, and each of the plurality of values represents a correlation between two of the plurality of positions. For example, a 2×2 feature map shown in Table 2 below has four positions A, B, C, and D. According to this feature map, a 4×4 attention map can be generated, which contains 16 values (A, A), (A, B), . . . , (D, D), where (X, Y) represents the correlation between position X and position Y.

In an embodiment, the implementation of the attention module 13 adopts a self-attention module from Self-Attention Generative Adversarial Networks (SAGAN). The self-attention module computes the correlation matrix that represents spatial dependencies between any two positions within the input feature maps. Each position is calculated and updated by the weighted sum of all other positions. The weight values are decided by learning dependencies between the two positions. Therefore, any two positions with similar features or strong dependencies will be represented in the correlation matrix and mutually contribute to the final response regardless of their distance on the input image or feature maps.

TABLE 2 example of a feature map.

| | |
|---|---|
| A | B |
| C | D |

TABLE 3 example of an Attention Map

| | | | |
|---|---|---|---|
| (A, A) | (A, B) | (A, C) | (A, D) |
| (B, A) | (B, B) | (B, C) | (B, D) |
| (C, A) | (C, B) | (C, C) | (C, D) |
| (D, A) | (D, B) | (D, C) | (D, D) |

In step U22, the attention module 13 divides the plurality of values into a plurality of groups, sums each group to generate the plurality of attention scores. Referring to the example above, the grouping is based on the rows of the attention map, and the attention module 13 generates four attention scores $S_1$ to $S_4$, where:

$$S_1 = (A, A) + (A, B) + (A, C) + (A, D)$$

$$S_2 = (B, A) + (B, B) + (B, C) + (B, D)$$

$$S_3 = (C, A) + (C, B) + (C, C) + (C, D)$$

$$S_4 = (D, A) + (D, B) + (D, C) + (D, D)$$

In step U23, the attention module 13 adjusts the numerical range of each attention score. In an embodiment, the numerical range is between 0 and 1. The adjustment methods include using the softmax function or dividing each individual attention score by the sum of all attention scores.

Please refer to FIG. 2 and FIG. 3. In step U3, the noise generation module 15 generates a plurality of noises $\mathcal{N}$, and then the multiplication module 17 multiplies each attention score $\bar{S}$ with the plurality of noises $\mathcal{N}$ respectively to generate a plurality of weighted noises. In an embodiment, the noises $\mathcal{N}$ are Gaussian noise. Assuming the adjusted attention scores are $\bar{S}$, the multiplication module 17 calculates $(1-\bar{S})\times\mathcal{N}$. The purpose of adding noises $\mathcal{N}$ is to simulate the blur effect of human memory. The more important the position in the feature map $f_{\mathcal{R}}$ is, the larger the corresponding attention score $\bar{S}$ will be, thus the impact of noise $\mathcal{N}$ on that position should be smaller. Additionally, sending the feature map $f_{\mathcal{R}}$ to the noise generation module aims to determine how many noises need to be added to the attention map.

In step U4, the addition module 19 adds the plurality of weighted noises to the plurality of positions of the feature map $f_{\mathcal{R}}$ to generate the data essence $E_{\mathcal{R}}$. Referring to the example above and assuming the adjusted attention scores $S_1$ to $S_4$ become $\bar{S}_1$, $\bar{S}_2$, $\bar{S}_3$, $\bar{S}_4$, the data essence $E_{\mathcal{R}}$ is as shown in Table 4 below.

TABLE 4

| example of data essence | |
|---|---|
| $A+\bar{S}_1$ | $B+\bar{S}_2$ |
| $C+\bar{S}_3$ | $D+\bar{S}_4$ |

FIG. 7 is a flowchart of the training procedure according to an embodiment of the present disclosure, including steps W1 to W3.

In step W1 (corresponding to row 06 of Table 1), the computing device obtains a training batch including a plurality of data.

In step W2 (corresponding to row 07 of Table 1), the computing device updates the replay memory according to the training batch. The replay memory before updating includes a plurality of data from old training batches. Please refer to FIG. 8 for details of step W2.

In step W3 (corresponding to row 08 of Table 1), the computing device trains the model according to the replay memory and the essence memory. Please refer to FIG. 9 for details of step W3. The algorithm corresponding to step W3 in the present disclosure is referred to as "Experience Blending".

FIG. 8 is a flowchart of the method for updating the replay memory according to an embodiment of the present disclosure. As shown in FIG. 8, this method includes steps W21 to W25. Table 5 provides the pseudocode corresponding to the method. Please refer to both FIG. 8 and Table 5.

TABLE 5

| | pseudocode for updating the replay memory. |
|---|---|
| 70 | function ImportanceSampling($\mathcal{B}$, $\mathcal{R}$, $\mathcal{M}$) |
| 71 | for each sample b in $\mathcal{B}$ do |
| 72 | if $\lvert\mathcal{R}\rvert = n$ then |
| 73 | Remove the least important sample in $\mathcal{R}\cup b$ with respect to $\mathcal{M}$ |
| 74 | else |
| 75 | $\mathcal{R}\leftarrow\mathcal{R}\cup b$ |
| 76 | end if |
| 77 | return $\mathcal{R}$ |
| 78 | end for |
| 79 | end function |

In step W21 (corresponding to row 71 of Table 5), the computing device obtains a candidate datum from the plurality of data of the training batch.

In step W22 (corresponding to row 72 of Table 5), the computing device determines whether the storage space of the replay memory has reached an upper limit. Step W23 is performed if the determination is true. Step W24 is performed if the determination is false.

In step W23 (corresponding to row 73 of Table 5), since the replay memory is full, the computing device removes the least important one from the candidate datum and the plurality of samples in the replay memory. The least important sample corresponds to the lowest importance score. In an embodiment, the computing device uses the algorithm "Update Sample-wise Importance" from "y. Koh, D. Kim, J.-W. Ha and J. Choi, Online continual learning on class incremental blurry task configuration with anytime inference, ICLR, 2022 (referred to as CLIB)" to calculate the importance score for each sample. Specifically, the model is trained using the training batch. Then, the loss difference before and after training with the batch is measured. If the loss decreases, the importance scores of the samples in the batch increase and vice versa.

In step W24 (corresponding to row 75 of Table 5), since the replay memory is not full, the computing device adds the candidate datum to the replay memory.

In step W25, the computing device determines if there is still datum in the training batch. Step W21 is performed if the determination is true. Step W3 is performed if the determination is false.

Through the above mechanism, the replay memory can filter out data with higher importance fmerom the training batch for storage.

FIG. 9 is a flowchart of the experience blending algorithm according to an embodiment of the present disclosure. As shown in FIG. 9, the algorithm includes steps W31 to W35. Table 6 provides the pseudocode corresponding to the algorithm. Please refer to both FIG. 9 and Table 6.

TABLE 6

| | pseudocode of experience blending algorithm. |
|---|---|
| 80 | function ExperienceBlending($\mathcal{E}$, $\mathcal{R}$, $\mathcal{M}$) |
| 81 | Initialize $\mathcal{M}_{mix}$ and $\mathcal{M}_E$ with $\mathcal{M}$ |
| 82 | Train $\mathcal{M}_{mix}$ with $\mathcal{E}\cup\mathcal{R}$ |
| 83 | Train $\mathcal{M}_E$ with $\mathcal{E}$ |
| 84 | $\mathcal{M}\leftarrow\alpha\mathcal{M}_{mix}+(1-\alpha)\mathcal{M}_E$ |
| 85 | Return $\mathcal{M}$ |
| 86 | end function |

Figure 10:
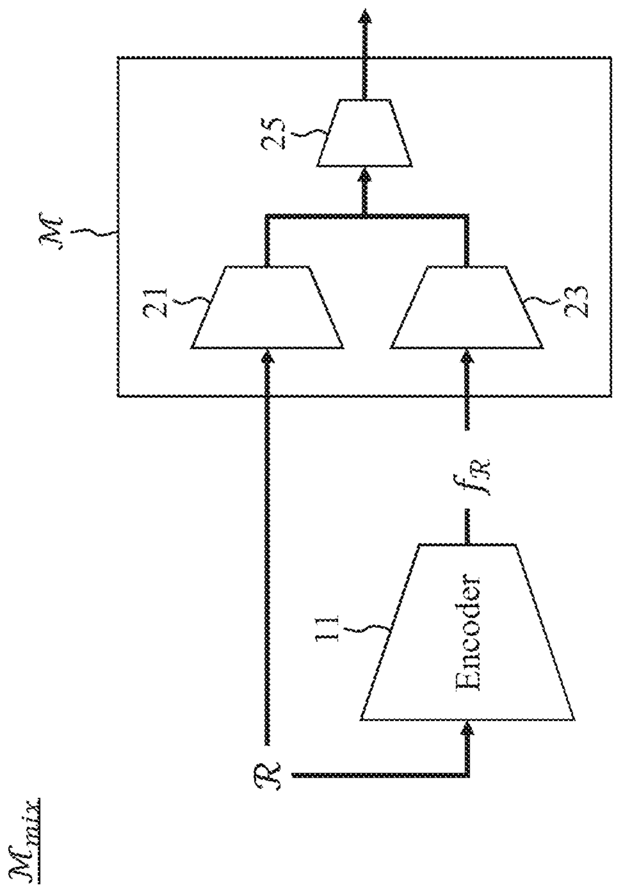
FIG. 10 and FIG. 11 respectively illustrate block diagrams of the first model and the second model.
Figure 11:
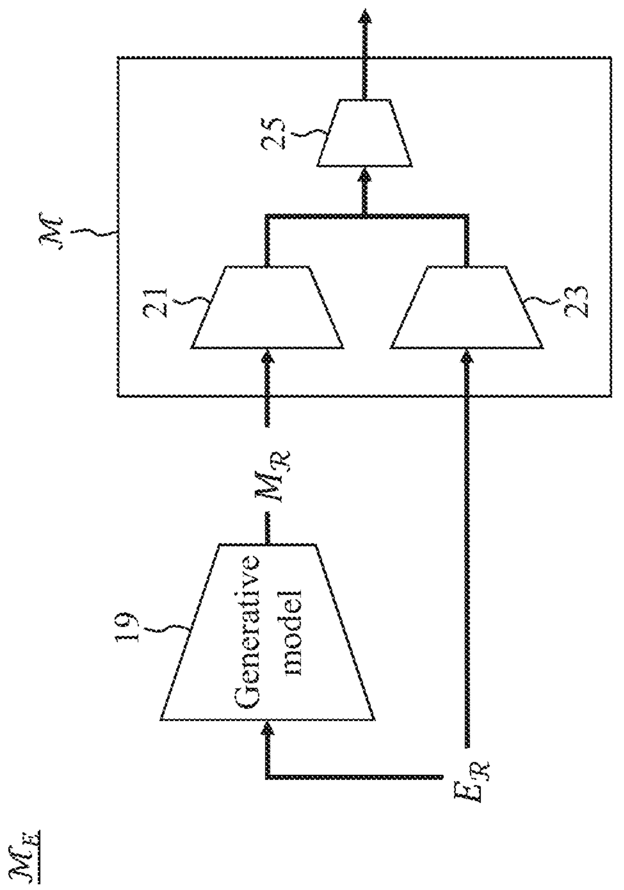

In step W31 (corresponding to row 081 of Table 6), the computing device initializes a first model and a second model according to the model. FIG. 10 and FIG. 11 respectively illustrate block diagrams of the first model and the second model. As shown in FIG. 10 and FIG. 11, both the first model $\mathcal{M}_{mix}$ and the second model $\mathcal{M}_E$ are built according to the architecture of the model $\mathcal{M}$, but they are trained separately according to different data. The model $\mathcal{M}$ includes a first feature generator 21, a second feature generator 23, and a classifier 25. In an embodiment, examples of the first feature generator 21 and the second feature generator 23 may include ResNet, VGG, MLP, Vision Transformer, but the present disclosure is not limited thereto.

In step W32 (corresponding to row 082 of Table 6), the computing device trains the first model $\mathcal{M}_{mix}$ according to the essence memory and the replay memory. As shown in FIG. 10, the first feature generator 21 generates a first feature according to the raw datum $\mathcal{R}$ the encoder 11 generates the feature map $f_{\mathcal{R}}$ according the raw datum $\mathcal{R}$, the second feature generator 23 generates a second feature according to the feature map $f_{\mathcal{R}}$, and the classifier 25 performs a classification according to a concatenation result of the first feature and the second feature, and finally outputs a classification result.

In step W33 (corresponding to row 083 of Table 6), the computing device trains the Text use second model $\mathcal{M}_E$ according to the essence memory.

Since the data essence $E_{\mathcal{R}}$ is not the raw datum $\mathcal{R}$, it is necessary to modify the original artificial intelligence model to recognize the data essence $E_{\mathcal{R}}$ and restore the data essence $E_{\mathcal{R}}$ to the original data structure. The modified result is shown in FIG. 11, where the generative model 19 generates a data anchor $M_{\mathcal{R}}$ according to the data essence $E_{\mathcal{R}}$, the first feature generator 21 generates the first feature according to the data anchor $M_{\mathcal{R}}$, the second feature generator 23 generates the second feature according to the data essence $E_{\mathcal{R}}$, and the classifier 25 performs a classification according to the concatenation result of the first feature and the second feature, and finally outputs a classification result. In an embodiment, the generative model 19 can adopt the decoder 16 shown in FIG. 4.

In step W34 (corresponding to row 084 of Table 6), the computing device calculates a weighted sum of the first model $\mathcal{M}$mix and the second model $\mathcal{M}_E$ as the final model. Specifically, since the first model $\mathcal{M}_{mix}$ and the second model $\mathcal{M}_E$ have the same architecture, the parameters corresponding to these two models can be multiplied by weights $\alpha$ and $(1-\alpha)$ respectively and then added together as the parameter of the final model. The present disclosure does not particularly limit the value of the weight a.

Table 7 below compares the method of training the model using data essence proposed in an embodiment of the present disclosure with the existing method CLIB. It can be seen from Table 7 that the present disclosure has a higher average accuracy ($A_{avg}$) on both datasets compared to CLIB.

TABLE 7 comparison between the present disclosure and CLIB.

| average accuracy | CIFAR-100 | TinyImageNet |
|---|---|---|
| CLIB | 49.22% ± 0.79 | 25.05% ± 0.52 |
| The present disclosure | 56.72% ± 0.27 (+7.49%) | 38.58% ± 0.78 (+13.53%) |

In view of the above, the present disclosure proposes a method of training a model using data essence, aiming to further reduce the performance degradation of models caused by the conversion of old and new data during training. The concept of the present disclosure simulates the way human memory is stored: less important parts of memory gradually become blurred, while more important parts remain sharp. Based on the concept, old data is transformed into highly refined data essence and stored. In new training, the stored data essence is restored to its original data structure using a generative model and then re-inputted into the model being trained with new data, thereby helping the model retain knowledge from previously trained data and reducing performance degradation caused by model updates. The mechanism of the present disclosure is similar to humans recalling events from fuzzy memory with the help of vivid details.

What is claimed is:

1. A method of training a model using data essence performed by a computing device and comprising:
- performing an essence generating procedure according to raw datum to generate a data essence;
- adding the data essence to an essence memory; and
- repeatedly performing a training procedure before the model converges, wherein the training procedure comprises:
  - obtaining a training batch;
  - updating a replay memory according to the training batch, wherein the replay memory before updating comprises a plurality of data from an old training batch; and
  - training the model according to the replay memory and the essence memory.

2. The method of training the model using data essence of claim 1, wherein the essence generating procedure comprises:
- generating a feature map according to the raw datum obtained from the replay memory;
- calculating a plurality of attention scores according to the feature map;
- multiplying the plurality of attention scores with a plurality of noises respectively to generate a plurality of weighted noises; and
- adding the plurality of weighted noises to the feature map to generate the data essence.

3. The method of training the model using data essence of claim 2, further comprising:
- before generating the feature map according to the raw datum, generating a plurality of pre-trained feature maps according to a plurality of training data;
- calculating a plurality of pre-trained attention maps according to the plurality of pre-trained feature maps; and
- generating a plurality of output results associated with the plurality of training data according to the plurality of pre-trained feature maps and the plurality of pre-trained attention maps.

4. The method of training the model using data essence of claim 2, wherein calculating the plurality of attention scores according to the feature map comprises;
- generating an attention map according to the feature map, wherein the feature map comprises a plurality of positions, the attention map is configured to record a plurality of values, and each of the plurality of values represents a correlation between two of the plurality of positions;
- dividing the plurality of values into a plurality of groups, summing each of the plurality of groups to generate the plurality of attention scores; and
- adjusting a range of each of the plurality of attention scores.

5. The method of training the model using data essence of claim 1, wherein updating the replay memory according to the training batch comprises:

obtaining a candidate datum from a plurality data of the training batch;

when a storage space of the replay memory reaches an upper limit, removing the least important one from the candidate datum and a plurality of samples in the replay memory; and when the storage space of the replay memory does not reach the upper limit, adding the candidate datum to the replay memory.

6. The method of training the model using data essence of claim 1, wherein training the model according to the replay memory and the essence memory comprises:

initializing a first model and a second model according to the model;

training the first model according to the essence memory and the replay memory;

training the second model according to the essence memory; and calculating a weighted sum of the first model and the second model as the model.

* * * * *